(12) United States Patent
Peirce

(10) Patent No.: US 9,304,551 B1
(45) Date of Patent: Apr. 5, 2016

(54) COMPUTER WITH INTEGRATED PIANO KEYBOARD

(71) Applicant: Benjamin Peirce, Canmore (CA)

(72) Inventor: Benjamin Peirce, Canmore (CA)

( * ) Notice: Subject to any disclaimer, the term of this patent is extended or adjusted under 35 U.S.C. 154(b) by 0 days.

(21) Appl. No.: 14/641,605

(22) Filed: Mar. 9, 2015

Related U.S. Application Data

(60) Provisional application No. 61/950,454, filed on Mar. 10, 2014.

(51) Int. Cl.
*G06F 1/16* (2006.01)
*H05K 5/00* (2006.01)
*H05K 7/00* (2006.01)

(52) U.S. Cl.
CPC ............ *G06F 1/1662* (2013.01); *G06F 1/1616* (2013.01)

(58) Field of Classification Search
CPC ... G06F 1/1624; G06F 1/1662; G06F 1/1669; G06F 1/1671
USPC ............... 361/679.26–679.3, 679.55–679.56, 361/679.08–679.2; 84/719
See application file for complete search history.

(56) References Cited

U.S. PATENT DOCUMENTS

| | | | |
|---|---|---|---|
| 4,352,313 A | 10/1982 | Ny | |
| 4,704,940 A | 11/1987 | Cummings | |
| 4,945,804 A * | 8/1990 | Farrand | G10G 3/04 84/462 |
| 5,088,378 A | 2/1992 | DeLaTorre | |
| D373,134 S | 8/1996 | Bertram et al. | |
| 5,646,648 A | 7/1997 | Bertram | |
| 5,971,635 A | 10/1999 | Wise | |
| 6,351,225 B1 | 2/2002 | Moreno | |
| 6,842,168 B1 * | 1/2005 | Sim | G06F 3/021 345/156 |
| 7,247,788 B2 * | 7/2007 | Lai | G10H 1/34 84/719 |
| 8,558,723 B2 | 10/2013 | Robinson et al. | |
| 9,053,688 B2 * | 6/2015 | Yoshikawa | G10H 1/00 |
| 2002/0144586 A1 * | 10/2002 | Connick, Jr. | G09B 15/023 84/478 |
| 2004/0231501 A1 * | 11/2004 | Sim | G10H 1/34 84/719 |
| 2005/0087061 A1 * | 4/2005 | Sim | G10H 1/0066 84/719 |
| 2005/0219217 A1 * | 10/2005 | Longobardi | G06F 1/1616 345/169 |
| 2013/0346636 A1 * | 12/2013 | Bathiche | G06F 13/102 710/8 |
| 2015/0027603 A1 * | 1/2015 | Mogol | G06F 1/1616 150/154 |

* cited by examiner

*Primary Examiner* — Anthony Haughton
(74) *Attorney, Agent, or Firm* — Robert C. Montgomery; Montgomery Patent & Design, LLC

(57) ABSTRACT

An apparatus is adapted to function as a laptop computer with an additional piano-style keyboard. The computer has disposed within the lower computer keyboard area a separate integrated piano keyboard. The piano keyboard of the apparatus is fully functional in conjunction with certain applications loaded to the laptop.

18 Claims, 4 Drawing Sheets

COMPUTER WITH INTEGRATED PIANO KEYBOARD

RELATED APPLICATIONS

The present invention was first described in and claims the benefit of U.S. Provisional Application No. 61/950,454, filed Mar. 10, 2014, the entire disclosures of which are incorporated herein by reference.

FIELD OF THE INVENTION

The present invention relates to a laptop computer having a music keyboard integrated into the body of the computer.

BACKGROUND OF THE INVENTION

Musicians today can produce the sound of almost any instrument imaginable with just the use of a standard computer and a small MINI-style electric keyboard. With just these two (2) individual components, melodic and harmonic riffs can be created almost anywhere within seconds. Additionally, aspiring musicians may in fact require a computer if they wish to make use of the numerously available brands of keyboard tutorial software programs.

However, as small as such modern components are, they still remain two (2) individual components that must be transported and stored separately and hooked together employing various connectors. Also, in order to make use of these components, sufficient space on a desk, table counter or other horizontal surface must be secured. Accordingly, there exists a need for a means by which the functionality and performance of a notebook computer and a keyboard can be enjoyed, but without the aforementioned disadvantages of two (2) separate components. The development of the present invention fulfills this need.

SUMMARY OF THE INVENTION

The inventor has recognized the aforementioned issues and inherent problems and observed that there is a lack in the prior art for a means to provide a laptop computer having a music keyboard integrated into the body of the computer.

It is therefore an object of the invention to provide a portable computing device, comprising a casing having a hollow structure further comprising data storage and processing components with input/output registers. The registers are disposed within the casing to process incoming data and store the processed data for later use. There is a computer keyboard disposed on a surface of the casing and placed into electrical communication with the input/output registers with the data storage and processing components. There is a flip panel pivotally attached to a top surface of the casing, a touch pad disposed on a top surface of the flip panel and in electrical communication with the input/output registers and the data storage and processing components.

A display is configured to receive said processed data and display the same. The processed data is at least one coalesced image having a shell and comprising a shell, an image display unit and display control registers. There is a hinged connection to rotatingly connect the casing to the display, a lower enclosure formed into the casing and a music keyboard disposed within the lower enclosure and in electrical communication with the input/output registers with the data storage and processing components. The flip panel selectively reveals and conceals the lower enclosure. The music keyboard and the computer keyboard are configured to provide the incoming data as inputted therein.

The portable computing device further comprises at least one of a distal end of a shaft which comprises a vertical shaft affixed to the casing, a hook, extending away from a first side of a distal end of the shaft and a knob. At least one (1) other of a distal end of the shaft comprises a vertical shaft affixed to the casing, a hook, extending away from a second side of a distal end of the shaft and a knob. Engagement of the hook with a tab protruding outwardly from the flip panel acts to secure the flip panel in a closed position. A force applied to the knob acts to release the flip panel. There is a pair of latches located on opposing sides of the casing, each engaging one (1) of a pair of tabs located on the flip panel.

The portable computing device further comprises at least one (1) added peripheral selected from the group consisting of: a DVD slot drive, a USB port, an HDMI connection, a BLUETOOTH® connection, an Ethernet connection, a Wi-Fi connection, a headphone, at least one speaker, and a microphone jack. Each added peripheral is in electronic communication with the data storage and processing components with the input/output registers. The device is configured to receive a sound card and has a power switch and rechargeable battery. The hinged connection is provided with a stop tension mechanism.

A different configuration of the portable computing device with music keyboard comprises a casing having a hollow structure. The device further comprises data storage and processing components with input/output registers disposed within the casing to process incoming data and store the processed data for later use. A computer keyboard is disposed on a surface of the casing and placed into electrical communication with the input/output registers with the data storage and processing components. A flip panel is pivotally attached to a top surface of the casing. A display is configured to receive the processed data and display the processed data as at least one (1) coalesced image having a shell. The shell comprises a shell, an image display unit and a display control registers. There is a hinged connection to rotatingly connect the casing to the display. A lower enclosure is formed into the casing. There is a music keyboard disposed within the lower enclosure and in electrical communication with the input/output registers and the data storage and processing components.

The flip panel comprises a planar member, a touch pad disposed on a top surface of the flip panel. The flip panel is attached to a top surface of the case by a pair of matched first pivot links and second pivot links. The first pivot links and second pivot links are attached at a first end to the case and attached at a second end to a plurality of hinged connections around the periphery of the flip panel. The touch pad is in electrical communication with the input/output registers with the data storage and processing components. The flip panel is pivotally engaged with the casing such that the flip panel enables selective cover and concealment of the music keyboard when in a closed position. The flip panel selectively reveals and conceals the lower enclosure. The music keyboard, computer keyboard, and touch pad are configured to provide the incoming data as inputted therein.

The above device further comprises at least one (1) added peripheral selected from the group consisting of a DVD slot drive, a USB port, an HDMI connection, a BLUETOOTH® connection, an Ethernet connection, a Wi-Fi connection, a headphone, at least one speaker, and a microphone jack. Each added peripheral is in electronic communication with the data storage and processing components with the input/output registers.

The device is configured to receive a sound card, power switch and rechargeable battery. The device further comprises at least one (1) of a distal end of the shaft comprising a vertical shaft affixed to the casing, a hook, extending away from a first side of a distal end of the shaft and a knob.

There is at least one (1) of a distal end of the shaft comprising a vertical shaft affixed to the casing, a hook, extending away from a second side of a distal end of the shaft and a knob. Engagement of the hook with a tab protruding outwardly from the flip panel, acts to secure the flip panel in a closed position. A force applied to the knob acts to release the flip panel. There is a pair of latches located on opposing sides of the casing, with each engaging one (1) of a pair of tabs located on the flip panel. The touch pad is provided with clickable features and dedicated left-click and right-click mouse features. The hinged connection is provided with a stop tension mechanism. The hinged connection is provided with electrical connectors. Likewise, the pivotal engagement of the flip panel with the casing is provided with electrical connectors.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
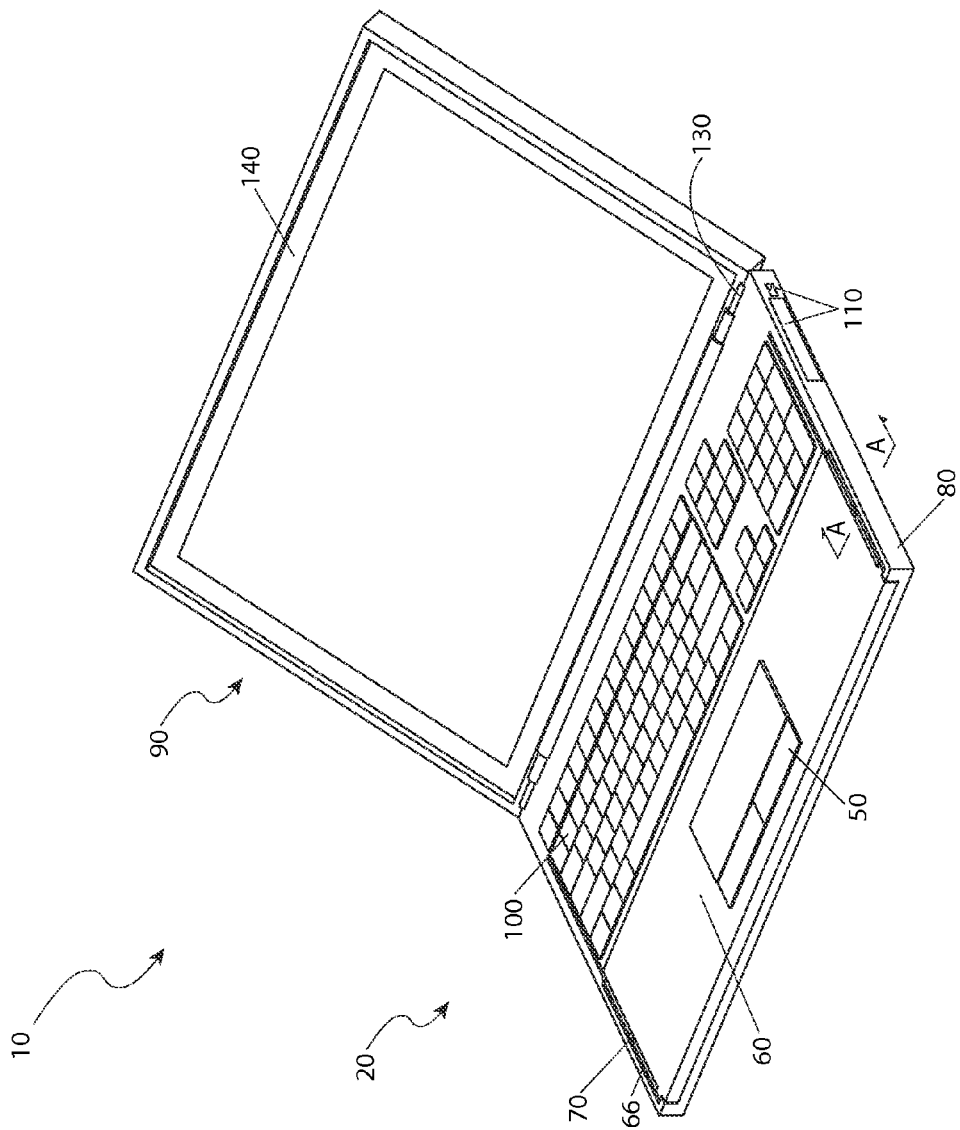
FIG. 1 is a perspective view of a computer 20 with integrated piano keyboard 30 with the flip panel 60 in a closed position, in accordance with the preferred embodiment of the present invention.

- 10 computer with piano keyboard
- 20 computer
- 30 music keyboard
- 40 lower enclosure
- 50 touch pad
- 60 flip panel
- 62 pivot pin
- 64 link recess
- 66 first pivot link
- 68 second pivot link
- 70 latch
- 72 tab
- 74 vertical shaft
- 76 hook
- 78 knob
- 80 case
- 90 display
- 100 computer keyboard
- 110 peripheral
- 120 data storage and processing components
- 130 hinged connection
- 140 shell
- 160 musical keys
- 170 music keyboard interface

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a computer 20 with an integrated music keyboard 30 (herein referred to as the "computer" 20), where the music keyboard 30 is housed within a lower enclosure 40 and selectively placed into operational use via a flip panel 60 disposed on a case 80 of the computer 20. In a preferred embodiment, the computer 20 is stylized as a laptop-, or notebook-style computer.

Figure 2:
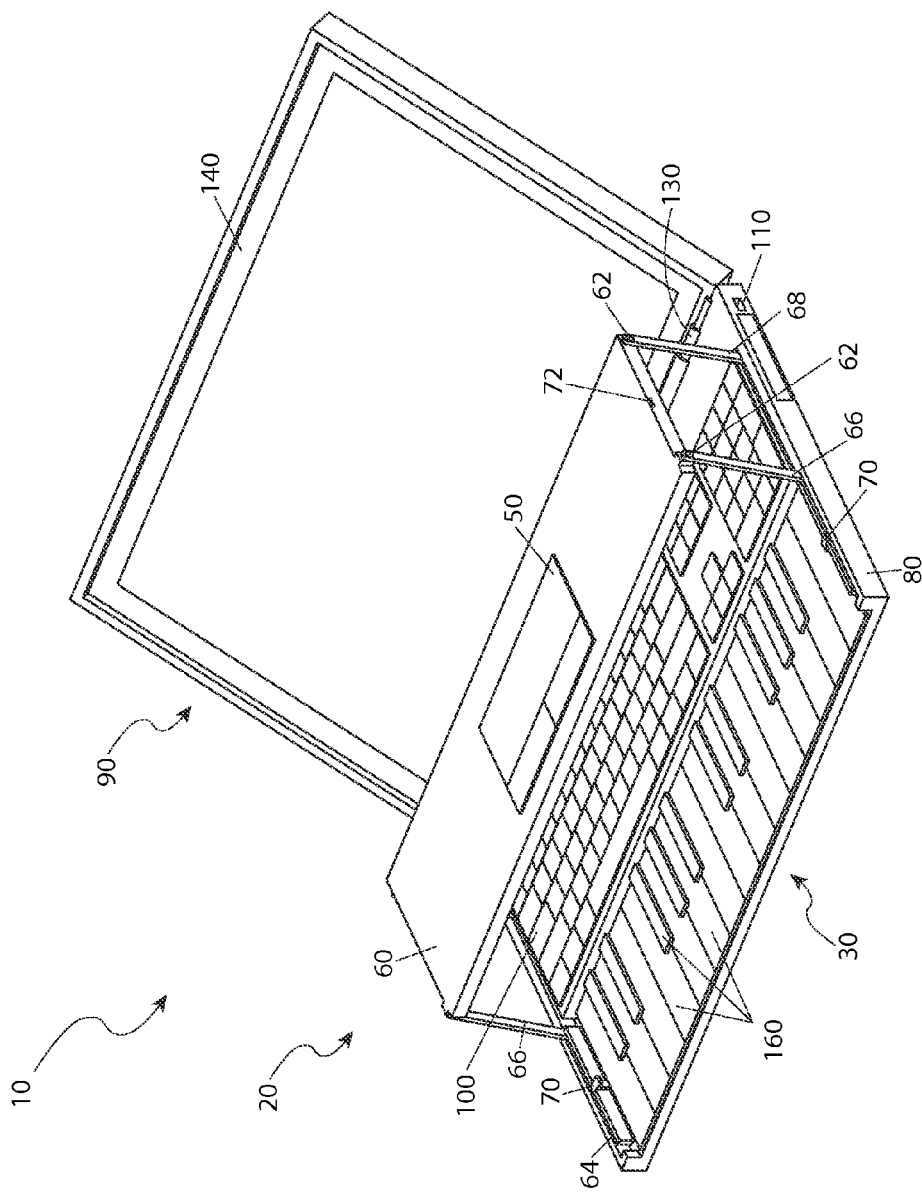
FIG. 2 is a perspective view of the computer 20 with the flip panel 60 in a deployed state, in accordance with the preferred embodiment of the present invention.

Referring now to FIGS. 1 and 2, perspective views of the computer 20 with the flip panel 60 in closed, and a deployed state, in accordance with the preferred embodiment of the present invention, are disclosed. The computer 20 is preferably configured as a notebook-style computer 20 with a music keyboard 30 integrated into the case 80 of the computer 20. The case 80 of the computer 20 is provided with a flip panel 60 into which a touch pad 50 is integrated. This flip panel 60, when open, exposes the subjacent music keyboard 30 that is disposed within a lower enclosure 40. The music keyboard 30 is preferably comprised of twenty five (25) musical keys 160 configured as two (2) full octaves of the Standard Western Chromatic scale plus one (1) additional note equivalent to the next C note in an ascending scale and is provided with associated electronics that permit an interface with previously installed music software programs in the computer 20. This allows the computer 20 to be used as an instrument during live shows, practice sessions, music writing sessions, DJ sessions, and the like. When the music keyboard 30 is not needed, the flip panel 60 is closed to make the computer 20 appear and function as a conventional computer 20.

The computer 20 comprises a case 80, a display 90, a computer keyboard, 100, and a touch pad 50, which are interconnected and situated in a conventional configuration as described and disclosed in U.S. Pat. No. 8,552,991. The case 80 is a hollow member to which the display 90 is hingedly attached along a rearward edge by a hinged connection 130. The display 90 comprises a shell 140 that holds a display unit and other electrical components. The case 80 and shell 140 comprise a light-weight rigid material that preferably exhibits electro-magnetic properties that do not create inductive interference or electric interference with the operations of the electrical components of the computer 20. The hinged connection 130 is configured such that the display 90 rotates about an axis of the hinged connection 130 so that the display 90 may be rotated to any desired angle within an approximate one-hundred eighty degree (180°) range of rotation. The hinged connection 130 is preferably provided with a stop tension mechanism so as to maintain the display 90 at a desired angle with respect to the case 80. When the display 90 abuts the case 80, the computer 20 is in a closed position. When the display 90 is at an approximately forty-five degree (45°) angle or more, to the case 80, the computer 20 is in an open position. The hinged connection 130 further provides a means of electrical communication between the electrical components the case 80 and the display 90. Also disposed on a top surface of the case 80 is an alphanumeric computer keyboard 100, which is in electrical communication with input/output registers of the data storage and processing components 120 of the computer 20. The computer 20 is preferably provided with other commonly used and expected features such as a power switch, a rechargeable battery unit, and the like (see FIG. 4).

The computer 20 deviates from the conventional configuration disclosed in U.S. Pat. No. 8,552,991 by having a flip panel 60 attached to a top surface of the case 80 by a matched pair of first pivot links 66 and second pivot links 68 attached at a first end to the case 80 and at a second end to a plurality of hinged connections around the periphery of the flip panel 60. The pivot links 66, 68 are composed of a molded thermoplastic material having cylindrical pivot pins 62 disposed within apertures (not specifically shown) at each end thereof. Other materials, such as metal, or composites, may also be utilized without narrowing the scope of the computer 20. The pivot links 66, 68 are secured to the case 80 within link recesses 64 molded into the case 80. The link recesses 64 are configured to be grooves in the case 80 into which the pivot links 66, 68 may be rotationally folded when the flip panel 60 is in a closed position operationally placed superjacent to the musical keyboard 30, as illustrated in FIG. 1. The touch pad 50 is disposed upon the flip panel 60. The music keyboard 30 is disposed within the lower enclosure portion 40 of the case 80 beneath the flip panel 60 and enables electrical communication between the touch pad 50 and the data storage and processing components 120 of the computer 20. When the flip panel 60 is in a closed position, the touch pad 50 is positioned in front of the computer keyboard 100 in a conventional manner as described and disclosed in U.S. Pat. No. 8,552,991.

Figure 3:
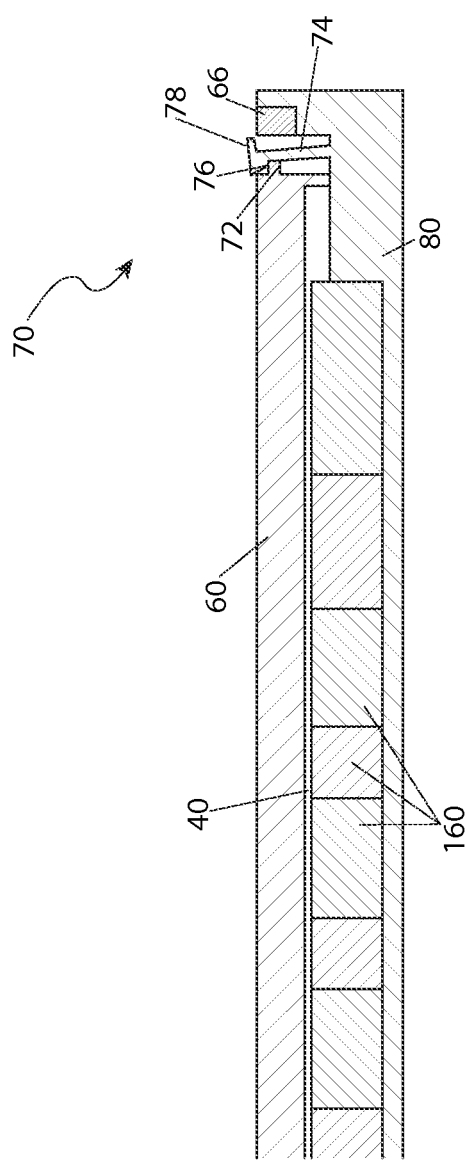
FIG. 3 is an isolated section view along line A-A, as seen in FIG. 1, of a lower enclosure 40 of the computer 20 in accordance with the preferred embodiment of the present invention; and, FIG. 4 is an electro-mechanical schematic of the computer 20 in accordance with the preferred embodiment of the present invention.

Referring now to FIG. 3, an isolated sectional view along line A-A as seen in FIG. 1 of the lower enclosure 40, in accordance with the preferred embodiment of the present invention, is disclosed. Disposed on opposing side edges of the lower enclosure 40 of the case 80, near the flip panel 60 are mirrored latches 70 configured to include a vertical shaft 74, a hook 76, and a knob 78. Engagement of the hooks 76 and the protruding tabs 72 molded into the flip panel 60 act to secure the flip panel 60 in a closed position. Each latch 70 is configured to be composed of the same constituent material as the remainder of the case 80 having the vertical shaft 74 capable of plastic deformation so as to respond as a spring to the application of a lateral force to the knob 78. Such a lateral force to the knob 78 motions each hook 76 away from each tab 72, thereby releasing the flip panel 60 for subsequent pivotal movement away from the casing 80. However, other latches 70 may be utilized without deviating from the teachings of the invention.

When the flip panel 60 is in an elevated/open position, access is granted to the lower enclosure 40 whereby the music keyboard 30 is exposed for use. The touch pad 50 is still in operational use when the flip panel 60 is open by virtue of a continued connection to, at minimum, the power source of the computer 20. Additional circuitry within the flip panel 60 may permit a wireless communication conduit with the data storage and processing components 120 of the computer 20 so as to permit the touchpad 50 to be fully operational.

Figure 4:
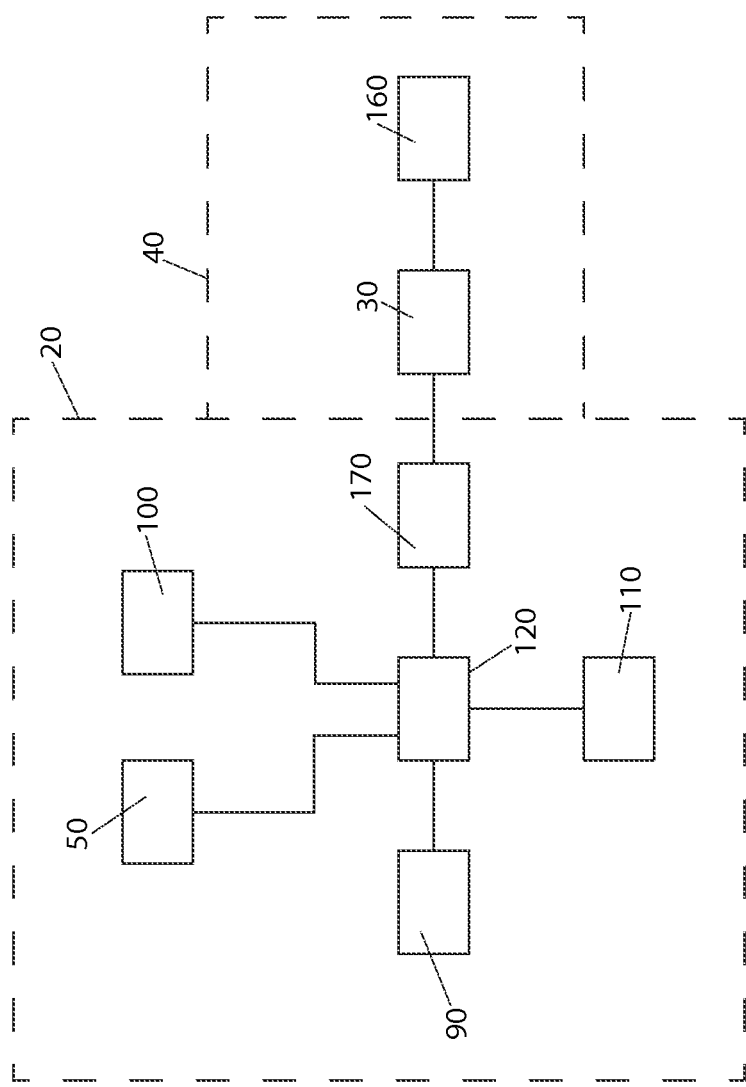

Referring now to FIG. 4, an electro-mechanical schematic of the computer 20, in accordance with the preferred embodiment of the present invention, is disclosed. The case 80 houses the data storage and processing components 120. The data storage and processing components 120 comprise the necessary electrical and mechanical components, such as a hard drive, a central processor, electrical circuitry, a ROM system, input/output registers, and other components that are commonly used and well known in the art for storing and processing binary information and operation of a computer 20. The interconnection and configuration of the data storage and processing components 120 for the conventional use of a computer 20 are described and disclosed in U.S. Pat. App. Pub. No. 2013/0106704 and U.S. Pat. No. 5,845,144. Preferably, the case 80 is provided with peripherals 110, such as a DVD slot drive, USB port, HDMI connection, BLUETOOTH® connectivity, Ethernet connectivity, Wi-Fi connectivity, a headphone, speakers, and microphone jacks, which are also common in the art and the operable configurations of which are described and disclosed in U.S. Pat. App. Pub. No. 2013/0106704. Each peripheral 110 is in electrical communication with the data storage and processing components 120 to enable command and control of each added feature 110 through the use of the computer keyboard 100, touch pad 50, and music keyboard 30.

The display 90 is hingedly affixed to the case 80, and houses an image display unit and display control registers, which receive processed data from the data storage and processing components 120 and illustrate the data as a coalesced image(s). The image display unit and display control registers may be configured as a CTR screen, LCD screen, OLED screen, or plasma screen, which are commonly used in the art and are described and disclosed in U.S. Pat. App. Pub. No. 2013/0106704 and U.S. Pat. No. 5,845,144. The communicative connection of the display 90 to the data storage and processing components 120 are performed in a conventional manner as is commonly done in the art and are also described and disclosed in U.S. Pat. App. Pub. No. 2013/0106704 and U.S. Pat. No. 5,845,144.

The computer keyboard 100 is a conventional QWERTY-type keyboard having a plurality of keys in connection with the input/output registers as described and disclosed in U.S. Pat. App. Pub. No. 2013/0106704 and U.S. Pat. No. 5,845, 144. The plurality of keys are disposed on an electrical contact board that is secured within the case 80 such that the keys are exposed to, and face upward from, a top surface of the case 80. As each key is depressed, electrical signals are transferred from the electrical contact board to the input/output registers of the data storage and processing components 120. The computer keyboard 100 preferably has a QWERTY key arrangement; however, other key arrangements may be utilized without deviating from the teachings of the invention.

The touch pad 50 is a conventional touch pad 50 having a tactile sensor and configured to transfer positions and motions of a finger or stylus making contact with the touch pad 50 to the display 90 as described and disclosed in U.S. Pat. App. Pub. No. 2013/0106704. The touch pad 50 is positioned to face upward from the flip panel 60 (see FIG. 1) and is in further electrical connection with the input/output registers of the data storage and processing components 120. In addition, the touch pad 50 is preferably equipped with clickable features, along with dedicated left-click and right-click mouse buttons, as described and disclosed in U.S. Pat. App. Pub. No. 2013/0106704.

The music keyboard 30 is in electrical communication with input/output registers of the data storage and processing components 120 of the computer 20. The music keyboard 30, as stated previously, comprises twenty five (25) musical keys 160 hingedly affixed to an electrical contact board (not shown), where each musical key 160 corresponds to a specific note of a conventional piano key set. In a preferred embodiment, the center musical key 160 corresponds to a "middle C" tonal vibration of two hundred sixty one point six Hertz (261.6 Hz). It is understood that other musical scales, having alternate intonations, may be utilized without limiting the scope of the computer 20. The electrical contact board is in electrical communication with the data storage and data processing components 120 via a music keyboard interface 170. This music keyboard interface is provided with a plurality of input/output registers that are configured to communicate to the data storage and processing components 120 when a musical key 160 is being depressed or allowed to be released. Preferably, the computer 20 operates with the use of application software, which translates actuations of the musical keys 160 into digitized representations of musical notes. In an alternate embodiment, the computer 20 is further configured to receive hardware, or software, to enable creating sounds of other musical instruments such as, but not limited to, organs, percussion instruments, guitars, or a selection of harmonious intonations intended to replicate a human chorus.

The preferred embodiment of the present invention can be utilized by the common user in a simple and effortless manner with little or no training. After initial purchase or acquisition of the computer 20, it would be installed as indicated in FIGS. 1 and 2. The method of utilizing the computer 20 may be achieved by performing the following steps: acquiring a model of the computer 20; installing application software compatible with the operating system of the computer 20 to translate actuations of the piano keys 160 into digitized representations of musical notes; ensuring that the flip panel 60 is in a closed position; employing the computer 20 in a conventional manner by using the computer keyboard 100, touch pad 50, and display 90; using the touch pad 50 and computer keyboard 100 to initiate the application software; using the latch 70 to unlatch the flip panel 60; rotating/pivoting the pivot links 66, 68 to move the flip panel 60 to an open position, thereby exposing the music keyboard 30 for use; actuating the piano keys 160 to generate musical sounds in accordance with the application software; allowing the data storage and processing components 120 to generate and store musical sound in accordance with the application software; employing the computer keyboard 100 and touch pad 50, as needed, to modify, compile, and edit the music for multimedia applications and music composition; placing the flip panel 60 in a closed position and securing it with the latch 70; and, employing the computer keyboard 100 and touch pad 50 to further modify, compile, and edit the music for multimedia applications and music composition, if desired.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A portable computing device, comprising:
a casing having a hollow structure, comprising:
    data storage and processing components with input/output registers disposed within said casing to process incoming data and store said processed data for later use; and,
    a computer keyboard disposed on a surface of said casing and placed into electrical communication with said input/output registers with said data storage and processing components;
    a flip panel pivotally attached to a top surface of said casing;
    a touch pad disposed on a top surface of said flip panel and in electrical communication with said input/output registers and said data storage and processing components; and,
a display configured to receive said processed data and display said processed data as at least one coalesced image having a shell, comprising:
    a shell;
    an image display unit; and,
    display control registers;
a hinged connection to rotatingly connect said casing to said display;
a lower enclosure formed into said casing; and,
a music keyboard disposed within said lower enclosure and in electrical communication with said input/output registers with said data storage and processing components;
wherein said flip panel selectively reveals and conceals said lower enclosure; and,
wherein said music keyboard and said computer keyboard are configured to provide said incoming data as inputted therein.

2. The device recited in claim 1, further comprising at least one of a distal end of said shaft comprising a vertical shaft affixed to said casing, a hook, extending away from a first side of a distal end of said shaft and a knob;
    at least one of a distal end of said shaft comprising a vertical shaft affixed to said casing, a hook, extending away from a second side of a distal end of said shaft and a knob;
    wherein engagement of said hook with a tab protruding outwardly from said flip panel, acts to secure said flip panel in a closed position; and,
    wherein a force applied to said knob acts to release said flip panel.

3. The device of claim 2, further comprising a pair of latches located on opposing sides of said casing, each engaging one of a pair of tabs located on said flip panel.

4. The device recited in claim 1, further comprising at least one added peripheral selected from the group consisting of: a DVD slot drive, a USB port, an HDMI connection, a BLUETOOTH® connection, an Ethernet connection, a Wi-Fi connection, a headphone, at least one speaker, and a microphone jack;
    wherein each added peripheral is in electronic communication with said data storage and processing components with said input/output registers.

5. The device recited in claim 1, wherein said device is configured to receive a sound card.

6. The device recited in claim 1, wherein said device is configured with a power switch and rechargeable battery.

7. The device recited in claim 1, wherein said hinged connection is provided with a stop tension mechanism.

8. A portable computing device with music keyboard, comprising:

a casing having a hollow structure, comprising:
>   data storage and processing components with input/output registers disposed within said casing to process incoming data and store said processed data for later use; and,
>   a computer keyboard disposed on a surface of said casing and placed into electrical communication with said input/output registers with said data storage and processing components;
>
> a flip panel pivotally attached to a top surface of said casing;
> a display configured to receive said processed data and display said processed data as at least one coalesced image having a shell, comprising:
>   a shell;
>   an image display unit; and,
>   display control registers;
> a hinged connection to rotatingly connect said casing to said display;
> a lower enclosure formed into said casing;
> a music keyboard disposed within said lower enclosure and in electrical communication with said input/output registers and said data storage and processing components; and,
> a flip panel, comprising:
>   a planar member; and,
>   a touch pad disposed on a top surface of said flip panel;
>   wherein said flip panel is attached to a top surface of said case by a pair of matched first pivot links and second pivot links;
>   wherein said first pivot links and second pivot links are attached at a first end to said case and attached at a second end to a plurality of hinged connections around the periphery of said flip panel;
>   wherein said touch pad is in electrical communication with said input/output registers with said data storage and processing components;
>   wherein said flip panel is pivotally engaged with said casing such that said flip panel enables selective cover and concealment of said music keyboard when in a closed position;
> wherein said flip panel selectively reveals and conceals said lower enclosure; and,
> wherein said music keyboard, said computer keyboard, and said touch pad are configured to provide said incoming data as inputted therein.

9. The device recited in claim 8, further comprising at least one added peripheral selected from the group consisting of: a DVD slot drive, a USB port, an HDMI connection, a BLUETOOTH® connection, an Ethernet connection, a Wi-Fi connection, a headphone, at least one speaker, and a microphone jack;
> wherein each added peripheral is in electronic communication with said data storage and processing components with said input/output registers.

10. The device recited in claim 8, wherein said device is configured to receive a sound card.

11. The device recited in claim 8, wherein said device is configured with a power switch and rechargeable battery.

12. The device recited in claim 8, further comprising at least one of a distal end of said shaft comprising a vertical shaft affixed to said casing, a hook, extending away from a first side of a distal end of said shaft and a knob;
> at least one of a distal end of said shaft comprising a vertical shaft affixed to said casing, a hook, extending away from a second side of a distal end of said shaft and a knob;
> wherein engagement of said hook with a tab protruding outwardly from said flip panel, acts to secure said flip panel in a closed position; and,
> wherein a force applied to said knob acts to release said flip panel.

13. The device of claim 12, further comprising a pair of latches located on opposing sides of said casing, each engaging one of a pair of tabs located on said flip panel.

14. The device recited in claim 8, wherein said touch pad is provided with clickable features.

15. The device recited in claim 14, wherein said touch pad is provided with dedicated left-click and right-click mouse features.

16. The device recited in claim 8, wherein said hinged connection is provided with a stop tension mechanism.

17. The device recited in claim 8, wherein said first hinged connection is provided with electrical connectors.

18. The device recited in claim 8, wherein said pivotal engagement of said flip panel with said casing is provided with electrical connectors.

\* \* \* \* \*